United States Patent [19]

Terakawa et al.

[11] Patent Number: 5,753,330
[45] Date of Patent: May 19, 1998

[54] CYLINDRICALLY SHAPED PRODUCT

[75] Inventors: Taiju Terakawa; Satoshi Ogata, both of Shigaken, Japan

[73] Assignee: Chisso Corporation, Osaka, Japan

[21] Appl. No.: 560,549

[22] Filed: Nov. 17, 1995

[30] Foreign Application Priority Data

Dec. 22, 1994 [JP] Japan ................... 6-336388

[51] Int. Cl.$^6$ ................... B29D 22/00
[52] U.S. Cl. .............. 428/36.3; 156/167; 156/173; 428/373
[58] Field of Search ................... 428/36.3, 288, 428/296, 373; 156/167, 169, 173, 175, 191, 192, 308, 309.6, 308.2

[56] References Cited

U.S. PATENT DOCUMENTS 4,100,009   7/1978   Nakajima et al. ................ 156/184

FOREIGN PATENT DOCUMENTS

| 2-145842 | 6/1990 | Japan . |
| 2-182963 | 7/1990 | Japan . |
| 4-108506 | 4/1992 | Japan . |
| 5-263353 | 10/1993 | Japan . |
| 6-91105 | 4/1994 | Japan . |

*Primary Examiner*—James J. Bell
*Attorney, Agent, or Firm*—Lowe, Price, LeBlanc & Becker

[57] ABSTRACT

A cylindrically shaped product having superior filtrability, water-permability, etc., a process for producing the same in a good efficiency, and a filter and a draining material using the same are provided, the cylindrically shaped product obtained by winding multi-component, conjugate spun-bonded long fibers, consisting of at least two components of a lower melting resin component and a higher melting resin component, the melting temperature difference therebetween being 10° C. or higher, and cylindrically shaped product having been hot-melt-adhered by the lower melting resin component.

12 Claims, No Drawings

CYLINDRICALLY SHAPED PRODUCT

DETAILED DESCRIPTION OF THE INVENTION

1. Field of the Invention

This invention relates to a cylindrically shaped product and a process for producing the same. More particularly, it relates to a shaped product obtained by spinning long fibers according to conjugate, spun bonding process, hot-melt-adhering the fibers and shaping the resulting fibers into a cylindrical form, and suitable to filter, draining material, etc., and a process for producing the molded product.

2. Description of the Related Art

A cylindrically shaped product using hot-melt-adhesive fibers has characteristics of superior filtrability, hardness and lightweight, and has been used as cartridge filter, draining material, etc. As a cylindrically shaped product of such a type, the following products have so far been known:

- a product obtained by preparing a web from a side-by-side, hot-melt-adhesive, conjugate fiber staple according to a carding process, followed by winding up the staple on a core under heating (Japanese patent publication No. Sho 56-43139);
- a product obtained by preparing a non-woven fabric from a hot-melt-adhesive, multi-divided type conjugate fiber stable, followed by winding up the fabric on a porous core (Japanese patent application laid-open No. Hei 4-108506, and No. Hei 6-091105); etc.

However, the production step of the cylindrically shaped product disclosed in the above Japanese patent publication No. Sho 56-43139 is very complicated. Namely, the production step is carried out by stretching fibers once subjected to conjugate spinning, followed by imparting crimps by means of a crimper, drying, cutting by a cutter, etc. the fibers, to obtain the so-called staple of short fibers, subjecting the staple to carding step, etc., and winding up the web into a cylindrical form, under heating; hence the productivity of such a production step is very low.

Further, to such conjugate fibers is usually attached an oiling agent for improving card-passing property and staple-opening property at the time of spinning. Thus, when such a cylindrically shaped product is used for filter or the like, there have been raised problems that the oiling agent bubbles at the time of filtration; the oiling agent is mixed into the filtrate; etc. Thus, it has been restricted to use the cylindrically shaped product in the fields of foods, potable water, chemicals, etc. Further, since the product uses staple, it is liable to fluff at the inner part of the fiber layer and on the surface of the product.

The fluffs are effective for easily seizing particles at the time of filtration, but on the other hand, the product has the following drawback:

after the product has been once used, and when it is reused for the so-called counter-washing, etc., it is difficult to remove the seized particles; hence the product cannot be reused.

Further, when fibers of large fineness are used, conjugate fibers cause ply separation at the time of carding, and fibrillated fibers are liable to occur therein. At the time of the carding, the fibrillated fibers are cut to form powdery matters, and the matters mix in the web and damage the environment. Further, the powdery matters heap on the various parts of carding machine, heater, shaping machine, etc., solidify into the bulk or flock form and are liable to drop on the web and mix therein. Thus, the product obtained by using such a staple raises a problem that a phenomenon that the filtration accuracy is dispersed, that is, the filtration accuracy is inferior.

Further, the cylindrically shaped product using the above divided type, conjugate fiber staple, requires a spinnerette of a special structure, and superfluous steps such as needle punching, water needle processing, etc., are required. The product is very low in the productivity and expensive. Further, since a staple is used, the above problems due to oiling agent, fluffing, etc. are raised. The divided type conjugate fibers are designed so that they may be easily divided into a multi-division such as three-divisions or more by means of impact of needle punching, water needle, carding, etc. Thus, even when fibers after divided, having a single fiber fineness as small as about 1 d/f or less, are used, a part of the conjugate fibers are divided at the time of carding, so that fibers of fibril form are liable to be formed. Further, bulk fibers having single fibers of the fibril form entangled with each other or powdery matters of peeld fibers are liable to be formed. Further, undivided fibers of large fineness are present as a mixture in a large quantity. Further, needle holes, etc. due to needle punching, water needle, etc. for division are formed. Thus, there is a problem that even when the single fibers after divided are those of small fineness, the above filtration accuracy, the stability of the filtration accuracy, etc. are inferior.

Japanese patent application laid-open No. Hei 2-14582 discloses a hot-melt-adhesive non-woven fabric according to sheath-and-core type conjugate spun bonding process wherein the sheath component is composed of polypropylene and the core component is composed of polyethylene terephthalate, and Japanese patent application laid-open No. Hei 5-263353 discloses a hot-melt-adhesive non-woven fabric according to sheath-and-core type conjugate spun bonding process wherein the sheath component is composed of a high density polyethylene and the core component is composed of ethylene-propylene random copolymer. Further, Japanese patent application laid-open No. Hei-2-182963 discloses a non-woven fabric having a latent crimpability and a heat-shrinkability, obtained by spinning polymers having different heat-shrinkabilities into fibers of side-by-side type, eccentric sheath-and-core tape, etc. according to spun bonding process, followed by subjecting the resulting web to supersonic bonding.

The above non-woven fabric obtained by subjecting two components having different melting points to conjugate spun bonding process has advantages of a high productivity, a high strength as a non-woven fabric, etc. Thus, the fabric has been regarded as suitable to use applications of a surface material for disposable diaper, various packaging materials, etc. However, the above laid-open patent applications do not suggest at all, application of the products to cylindrically shaping products.

Problem to be Solved by the Invention

The object of the present invention is to provide a cylindrically shaped product having solved the above problems, that is,the product has good filtrabilities in drainage property of underground water, filtration accuracy, stability of filtration accuracy, filtration life, pressure-resistance, etc. and is free of bubbling, and a process for producing the cylindricallly shaped product efficiently. Further, the object of the present invention is to provide a cylindrically shaped product which, after used as a filter, is easy to wash the resulting cake, and reusable in a certain case.

SUMMARY OF THE INVENTION

The present invention has the following constitutions of (1) to (20):

(1) A cylindrically shaped product obtained by binding around a core, multi-component, conjugate spun-bonded long fibers consisting at least of two components of a low melting resin component and a high melting resin component, the temperature difference between said at least two components being 10° C. or higher, and said at least two components being hot-melt-adhered by said low melting resin component.

(2) A cylindrically shaped product according to item (1), wherein said multi-component, conjugate spun-bonded long fibers consist of 10 to 90% by weight of said low melting resin component and 90 to 10% by weight of said high melting resin component, and said low melting resin component forms at least a part of the surface of the fibers.

(3) A cylindrically shaped product according to item (1) or item (2), wherein said multi-component, conjugate, spun-bonded long fibers have a ratio of the largest fineness to the smallest fineness of 1.5 or more and these long fibers are arranged along the thickness direction of said cylindrically shaped product.

(4) A cylindrically shaped product according to either one of items (1) to (3), wherein the dispersion index of the filtration accuracy of said body is 0.7 or less.

(5) A cylindrically shaped product according to either one of items (1) to (3), wherein other fibers are laminated to said conjugated, spun-bonded long fibers or mixed therein.

(6) A cylindrically shared product according to either one of items (1) to (3), wherein said multi-component, conjugate, spun-bonded long fibers have a fineness of 0.2 to 70,000 d/f.

(7) A cylindrically shaped product according to either one of items (1) to (3), wherein said low melting resin component is a resin selected from the group consisting of polyethylene, a crystalline copolymer of propylene with another α-olefin and a low melting polyester, and said high melting component is polypropylene.

(8) A cylindrically shaped product according to either one of items (1) to (3), wherein the resin of said low melting resin component is a resin selected from the group consisting of polyethylene, a crystalline copolymer of propylene with another α-olefin and a low melting polyester and said high melting resin component is polyethylene terephthalate.

(9) A cylindrically shaped product according to either one of items (1) to (3), wherein either one of the surface or the inside part of said cylindrically shaped product is embossed so as to form projections or depressions.

(10) A process for producing a cylindrically shaped product, which comprises spinning conjugate, long fibers consisting at least of two components of a low melting resin component and a high melting resin component, according to a multicomponent, conjugate, spun bonding process, these components having a temperature difference of 10° C. or higher, to obtain a web, followed by winding this web on a core, while heating the web at an adhesion temperature of said low melting resin or higher, to hot-melt-adhere said conjugate long fibers.

(11) A process for producing a cylindrically shaped product according to item (10), wherein said multi-component, conjugate spun-bonded long fibers consist of 10 to 90% by weight of a low melting resin component and 90 to 10% by weight of high melting resin component, and the low melting resin component forms at least a portion of the surface of the fibers.

(12) A process for producing a cylindrically shaped product according to either one of item (10) or item (11), characterized by spinning conjugate fibers by varying either one of the extruded quantity thereof or the taking-up velocity thereof at the time of spinning, to prepare a web having a ratio of the maximum fineness to the minimum fineness of the same fiber of the conjugate long fibers of 1.5 or more, followed by winding the web on a core while heating it at its hot-melt-adhesion temperature or higher, to hot-melt-adhere the low melting resin component of the long fibers and thereby arrange the long fibers having the fineness thereof varied by 1.5 time or more along the thickness direction thereof.

(13) A process for producing a cylindrically shaped product according to either one of items (10) to (12), characterized by feeding the conjugate fibers after spun into an air-sucker type pulling means, while quenching them at an air speed of 0.1 to 5 m/second, followed by spinning the fibers at a high speed of air current of 500 to 20,000 m/min., to make the fineness of the long fibers 0.2 to 300 d/f.

(14) A process for producing a cylindrically shaped product according to either one of items (10) to (12), characterized by spinning the conjugate fibers by the self-weight thereof at the time of spinning or by a draw roll, while quenching or not the fibers at the time of spinning, to make the fineness of the long fibers 17 to 70,000 d/f.

(15) A process for producing a cylindrically shaped product according to either one of items (10) to (12), wherein stretching of 1.2 to 9 times is carried out during the time since the spinning till production of the cylindrically shaped product.

(16) A process for producing a cylindrically shaped product according to either one of items (10) to (12), wherein said low melting resin component is a resin selected from the group consisting of polyethylene, a crystalline copolymer of propylene with another α-olefin and a low melting polyester and said high melting resin component is polypropylene or polyethylene terephthalate.

(17) A process for producing a cylindrically shaped product according to either one of items (10) to (12), characterized by laminating other fibers with the conjugate spun-bonded long fiber web in a layer form or blending other fibers therewith during the time since the spinning till production of the cylindrically shaped product.

(18) A process for producing a cylindrically shaped product according to either one of items (10) to (12), characterized by contacting an embossed roll with the web or the cylindrically shaped product at the time of shaping the cylindrically shaped product, to bring the surface or the inside part of the cylindrically shaped product into a form of projections and depressions.

(19) A filter using the cylindrically shaped product according to either one of items (1) to (3).

(20) A draining material using the cylindrically shaped product according to either one of items (1) to (3).

DETAILED DESCRIPTION OF THE INVENTION

The web used for the cylindrically shaped product of the present invention is a long fiber web obtained according to a multi-component, conjugate spun-bonding process. The long fibers are fibers obtained by conjugate-spinning at least two kinds of resin components having a melting temperature difference of 10° C. or higher, according to conjugate spun-bonding process. When the temperature difference is lower than 10° C., the temperature control at the time of heat-treatment mentioned below is difficult; hence hot-melt-adhesion of the web is insufficient so that a shaped product having a high hardness cannot be obtained, or on the contrary, the fibers are too much molten to form a film, or wrinkles occur due to abnormal shrinkage of web or non-woven fabric. As a result, it is impossible to obtain a cylindrically shaped product having a good filtrability and a good uniformity as a filtering medium.

As the resin components, practically two to four kinds of resins can be used, and the difference between the highest melting point and the lowest melting temperature may be 10° C. or higher. However, two kinds may be sufficient in most use applications.

As to the conjugate long fibers, the low melting resin component is enough to form at least a part of the fiber surface. Further, for the conjugate fibers, it is possible to use fibers of sheath-and-core type, eccentric sheath-and-core type, side-by-side type, island in sea type, etc.

In the conjugate long fibers, as to the conjugate ratio of the low melting resin component to the high melting resin component, the proportion of the low melting resin component is 10 to 90% by weight, and that of the high melting resin component is 90 to 10% by weight. If the proportion of the low melting resin component is less than 10% by weight, hot-melt-adhesion is insufficient in the heat-treatment for cylindrical shaping to afford a cylindrically shaped product having an insufficient hardness and an inferior pressure resistance. Further, fluffing may occur. Thus, when the shaped product is used as a filter, opening of the filtration layer is liable to occur, due to the pressure, vibration, etc. at the time of filtration, and the filtration accuracy is also inferior. Further, when it is used as a draining material, deformation is liable to occur. On the other hand, if the proportion of the low melting resin composition of the conjugate long fibers exceeds 90% by weight, the low melting resin component melts due to the heat treatment at the time of cylindrical shaping, so that the web forms a film; the pores inside the cylindrically shaped product, are clogged; and wrinkes occur on the surface of the shaped product and the shaped product is deformed due to shrinkage at the time of melt-heating. In order to overcome the above drawbacks, the weight ratio of the low melting resin/the high melting resin is more preferred to be within a range of 30/70 to 70/30.

Further, the fineness of the long fibers is varied depending upon the use applications of the aimed cylindrically shaped product, and it is about 0.2 to about 10,000 d/f in the case of filter and about 3 to about 70,000 d/f in the case of draining material. Further, the basis weight of web or non-woven fabric is not particularly limited, but it is about 4 to 2,000 g/m² from the standpoint of easiness, etc. of hot-melt-adhesion at the time of heating the cylindrically shaped product.

Usable resins as the resin components in the present invention are polyamides, polyethylene terephthalate, polybutylene terephthalate, low melting polyesters obtained by copolymerizing diols with terephthalic acid/isophthalic acid or the like, polyesters such as polyester elastomers, polypropylene, high density polyethylene, medium density polyethylene, low density polyethylene, linear low density polyethylene, polyolefins such as crystalline copolymer or terpolymer of propylene with another α-olefin, fluorine resins, mixtures of the foregoing resins, etc. and other melt-spinnable resins, etc.

Combinations of resins for conjugate spinning are those of resins having a melting temperature difference of 10° C. or higher. Examples thereof are high density polyethylene/polypropylene, low density polyethylene/propylene.ethylene.butene-1 crystalline copolymer, high density polyethylene/polyethylene terephthalate, nylon-6/nylon 66, low melting polyester/polyethylene terephthalate, polypropylene/polyethylene terephthalate, polyvinylidene fluoride/polyethylene terephthalate, mixture of linear low density polyethylene with high density polyethylene/polypropylene, etc.

Further, examples of preferable combinations are those of polyolefin/polyolefin, polyolefin/polyester and polyester/polyester, such as high density polyethylene/polypropylene, low density polyethylene/propylene.ethylene.butene-1 crystalline copolymer, high density polyethylene/polyethylene terephthalate, low melting polyester/polyethylene terephthalate, polypropylene/polyethylene terephthalate, etc. Further, when chemical resistance is taken into consideration, a combination of polyolefin/polyolefin is particularly preferable.

The conjugate spun-bonding process refers to a process for producing not yet hot-melt-adhered web, hot-melt-adhered non-woven fabric, etc., which process comprises melt-extruding a plurality of resin components from a plurality of extruders, spinning conjugate fibers of multi-components through spinning nozzles for conjugate spinning, drawing spun fibers by means of an air current-drawing type means such as air-sucker, collecting the fibers by means of a web-collecting device such as net conveyer, along with air current, and if necessary, treating the web by melt-adhesion or the like. In the present invention, when yarns of small fineness are aimed, spinning is carried out by introducing high pressure air current, but when yarns of large fineness are aimed, spinning may be carried out stopping the air current. Namely, spinning may be carried out substantially by self weight of fibers. Further, the fibers may be drawn by means of draw rolls or pinch rolls. Further, as to the air current-drawing type means, two or more sets thereof may be provided in front or rear of the drawing roll, etc.

As to the multi-component, conjugate, spun-bonded long fibers used in the present invention, the preferable fineness of the fibers falls within a range of 0.2 to 70,000 d/f. The spinning speed for producing such fibers may be that suitable to the required fineness. In the case where the fineness is about 0.2 to 300 d/f, preferably 0.5 to 100 d/f, the spinning speed is about 500 to 20,000 m/min. Further, in the case where the fineness is about 17 to 70,000 d/f, preferably 30 to 60,000 d/f, sucking by means of air sucker may be almost stopped, to carry out spinning by self weight of fibers, or spinning may be carried out by drawing by means of draw roll. Further, the high speed air current drawing means may be positioned after the draw roll, or in the case of low speed spinning, the means may be substantially absent. As to the spinneret, those of sheath-and-core type, side-by-side type, island-in-sea type, eccentric sheath-and-core type, etc. may be used. Such spinneret, air-sucker, etc. may be provided in a plural number.

Further, for the fibers after spun, stretching rolls, pinch rolls, means provided with stretching means such as air current type stretching means, etc. are usable. Such a stretching means may be provided at a position between the spinneret and the air sucker, or at a position between from air-sucker to net conveyer, or at a position between from net-conveyer to shaping machine, or at the like position. Of course, such means may be provided at a plurality of places. When the stretching means are used, the strength of fibers and non-woven fabrics are improved, and the pressure resistance, the degree of compaction, etc. of the resulting cylindrically shaped product are improved. Further, due to the stretching, the steric crimps of the resulting cylindrically shaped product occur to improve the micro-porous properties of the cylindrically shaped product.

Further, a means having a heating means incorporated therein may be used at either site from the spinneret to various means. As to the means having a heating means incorporated therein, when heating conditions are adequately established, it is possible to prepare a hot-melt-adhesive non-woven fabric or develop crimps, etc.

Further, in the present invention, a means having another collecting auxiliary means incorporated therein, at a site between the spinneret and the shaping means may be used. As the auxiliary means, means such as yarn-quenching means, needle-punching means, water current entanglement means, etc. are exemplified. In the case of the quenching means, gas, water, etc. are usable. Needle punching, water current entanglement means, etc. may be present in a series other than that of spinning.

As examples wherein the stretching means is incorporated, various means can be exemplified, such as a means having a plurality of stretching rolls incorporated at a site between the spinneret and the air-current type drawing means, or a means of collecting spun fibers between a pair of rotating pinch rolls provided with a function of collecting for a time, followed by stretching the resulting web, while pinching it between a pair of pinch rolls provided below the above rolls, and collecting the resulting web on a net conveyer provided therebelow. As the above pinch rolls provided with a function of collecting for a time, etc. the following pinch rolls are exemplified: metal rolls having a number of holes for discharging blown gas; rolls having a function of collecting while pinching between a pair of net-form rotating materials; rolls provided with a plurality of stretching rolls, etc.

The above rolls provided with a function of collecting for a time, etc. may be means provided with a pair of upper rolls and a pair of lower rolls and also provided with other functions such as heating, along with stretching function.

Further, the web once collected on the net conveyer, etc. may be subjected to a stretching means having combined rolls with net conveyer, etc.

Further, after spinning, the air current blown together with the web is usually removed by a suction-removing means. Of course, in the case where spinning was carried out by self-weight of fibers or at a low speed, without using air current, the above removal is unnecessary.

The cylindrically shaped product of the present invention is obtained by shaping the collected web according to the above spinning process or the hot-melt-adhesive non-woven fabric, into a cylindrical form. As a means therefor, it is possible to use a means for producing the cylindrically shaped product, provided with a heater, a cylindrically shaping means, etc., as main constituting members. For example, a winding type shaping means provided with an infrared heater and a metallic core, and a production process, as described in Japanese patent publication No. Sho 56-43139, may be employed.

As the heater, any of air-through heater, infrared heater, heating roll, heating emboss roll, etc. are usable. Further, as the cylindrically shaping machine, any of a machine of a type of drawing out a metallic core after shaping, a machine having a winding core around a porous core, etc. are usable.

For the cylindrically shaped product, the spinning according to the above spun-bonding process and the cylindrically shaping process may be continuously or separately carried out. In the case of the continuous process, an apparatus provided with a heater, a shaping machine of a type of winding around the core, etc. downstream of the web-collecting means may be employed. In the case of non-continuous process, once spun, not yet hot-melt-adhered web, hot-melt-adhered non-woven fabric, etc. may be shaped using an apparatus provided with a heating means, a shaping machine of a type of winding around the core, etc., separately from spinning. Further, according to a process of contacting the cylindrically shaped product with a metallic roll having projections and depressions engraved on the surface, under rotating, just after the winding or at the time of the winding, projections and depressions may be imparted on the surface or the inside part of the cylindrically shaped product. In this case, the surface area of the cylindrically shaped product increases, and since bypath routes are formed inside the shaped body, the filtration life is improved.

The collected web or hot-melt-adhesive non-woven fabric is shaped into cylindrical form, by using the above cylindrically shaping means, and winding the web or non-woven fabric on a core, while heating them at a temperature higher than the melting point of the lower melting resin component and at a temperature lower than the melting point of the higher melting point resin component, to thereby hot-melt-adhere the fibers at their intersections, due to the hot-melt-adhesion of the lower melting resin component. Thereafter, the shaped product is drawn from the core, and if necessary, it is also possible to subject the end surface to end surface-sealing treatment according to a process such as hot-melt-adhesion process, hot-melting process, binding process, adhesion of the end surface onto film or metal plate, etc.

Further, as to the cylindrically shaped product, the fineness thereof in the thickness direction thereof may be the same or different. In the case of different finenesses, for example, a product wherein the fineness changes from larger one to smaller one along the flow direction of fluid to be filtered, a product wherein the fineness changes from larger one, to smaller one and again to larger one, etc. are superior in either or all of the filtration accuracy, filtration life, pressure resistance, etc.

In order to further improve the filtrability, a product having a ratio of the maximum fineness to the minimum fineness of 1.5 or more, preferably 1.8 or more, is preferred.

The product having varied the fineness can be produced according to the following processes:

the product is obtained for example, by making constant the take-up speed among the spinning time corresponding to one piece of the cylindrically shaped product, during the spinning, and varying the quantity extruded from the spinning nozzles, for example, in the order of large quantity, medium quantity and small quantity or in the order of large quantity, small quantity and large quantity, along with the lapse of the spinning time, or by making the extruded quantity constant and varying the take-up speed as described above.

In the present invention of the cylindrically shaped product, other fibers may be laminated onto or blended with the conjugate spun-bonded long fibers. As the other fibers, fibers having different fineness, resin, etc. from those of the conjugate, long fibers may be used. For example, regular fibers such as polyamide fibers, active carbon fibers, polyester fibers, rayon, etc. and monofilament having a large fineness, etc. are mentioned. When other fibers are laminated or blended, it is possible to improve gas absorptivity, filtration accuracy, hardness of shaped product, etc. As to the other fibers, web, monofilament, woven or knit fabric, non-woven fabric, net, a product wherein single fibers are scattered, etc. may be mentioned. For example, when a sheet for membrane filter having a fiber diameter of 0.1 to 8 microns, etc. are laminated, the filtration accuracy is improved. A product having laminated a non-woven fabric, a woven fabric, etc. containing carbon fibers, has gas-adsorptivity.

Other fibers may be supplied from a means other than the conjugate-spinning means, at the time of or after the spinning of conjugate spun-bonded long fibers. For example, a process wherein, at the time of spinning, other fibers are supplied together with air, in the direction oblique to the spinning direction of the long fibers, a process wherein, after spinning, other fibers are laminated onto the long fiber web collected on a net conveyer, or the like process, are possible. Further, in the present invention, the quantity of other fibers blended has no particular limitation, but the quantity may be about 1 to 50% by weight in the aspects of the hardness, filtration accuracy, etc. of the cylindrically shaped product.

Filter and draining material of the present invention using the cylindrically shaped product exhibited superior practical characteristics. The details will be described in the following Examples.

EXAMPLE

The present invention will be described in more detail by way of Examples and Comparative examples. In addition, the evaluations of the physical properties, filtrability, etc. of the cylindrically shaped product were carried out according to the following methods:

(Filtration accuracy)

A circulation type, filtration tester consisting of a filter provided with a water tank containing water (30 l), a pump and a housing was used.

One piece of a filter medium is fixed onto the housing of the filter, and while water is circulated in a flow quantity of 30 l/min., 5 g of a definite cake is added to the water tank. Filtered water (100 cc) gathered one minute after the cake addition is filtered through a membrane filter. The sizes of particles caught on the membrane filter are measured by a measuring device for particle size distribution, and the size (μm) of the largest particle is measured. Using five pieces of the filter medium, measurement is carried out in the same manner, and the average value of the respective maximum values is referred to as filtration accuracy (μm).

(Dispersion index of filtration accuracy)

This index was calculated by the following equation based upon the data of the largest particle diameters measured with the five pieces of the filter medium, in the above filtration accuracy test:

Dispersion index of filtration accuracy=(A−B)/X wherein
X refers to the average value (μm) of the respective maximum values with five pieces of the filter medium;
A refers to the particle diameter (μm) of particle whose particle diameter is largest among the largest particle diameters with the five pieces of the filter medium.
B refers to the particle diameter (μm) of particle whose particle diameter is smallest among the largest particle diameters with the five pieces of the filter medium.

In addition, in the case where the dispersion index of the filtration accuracy is less than 0.7, this case was judged to belong to a small dispersion.

(Filtration life and pressure resistance)

In the above circulation type filtration accuracy test, a volcanic ash powder (average particle diameter: 12.9 microns, and the powder having a particle diameter in the range of 1.0 to 30 microns occupies 99% by weight or more of the total soil) is added as a cake in a quantity of 20 g, and circulating filtration is continued, and when water in the water tank has become clear, the pressure difference between the pressures before and after the filtration is measured. The addition of the powder and the measurement of the pressure difference are repeated till the filter is deformed or the difference between the inlet pressure and the exit pressure of the filter reaches 10 Kg/cm². The time since the first addition of the powder till the deformation of the filter is referred to as "filtration life" (minute) and the pressure difference at that time is referred to as "pressure resistance" (Kg/cm ²).

(Bubbling)

In the above filtration accuracy test, water alone was circulated for one minute before the cake addition, followed by observing the bubbling in the water tank. In the case where bubbling occurred on the total surface of the water tank, this case was judged to have bubbling, while in the case where bubbling was almost absent, the case was judged to have no bubbling.

Example 1

A cylindrically shaped product was produced, using a conjugate, spun-bonding spinning device provided with a conjugate-spinning machine, air-sucker, net-conveyer, etc. and a cylindrically shaping device provided with net-conveyer, far infrared rays heater, metal core-winding type shaping machine, etc. The spinning nozzle used was a sheath-and-core type conjugate spinning nozzle having a hole diameter of 0.4 mm.

Using a high density polyethylene of m.p. 133° C. and MFR 22 (190° C., g/10 min.), as a first component, on the sheath side, and a polypropylene of m.p. 164° C. and MFR 60 (230° C., g/10 min.) as a second component on the core side, spinning was carried out under conditions of a conjugate ratio of 50/50 (weight %), and a spinning temperature of the first component of 290° C. and that of the second component of 310° C., followed by sucking the resulting fibers by means of the air-sucker at a rate of 3,000 m/min. and blowing the fibers onto the net conveyer along with air. The blown air was sucked and removed by the sucking means provided below the net conveyer. The resulting fibers were sheath-and-core type long fibers having a fineness of 1.5 d/f. The basis weight was 20 g/m². The resulting web was heated at 145° C., while transferring it onto the cylindrically shaping machine by means of the net conveyer, followed by winding it onto a metal core having an outer diameter of 30 mm under heating, to afford a definite outer diameter, cooling down to 25° C., drawing out the core, and cutting, to obtain a cylindrical filter having an inner diameter of 30 mm, an outer diameter of 60 mm and a length of 250 mm. This filter has fibers hot-melt-adhered and was a hard product.

The test results of filtrability, etc. of the cylindrical filter are shown in Table 1. This filter exhibited superior properties of filtration accuracy, dispersion index of filtration accuracy, filtration life, etc. Bubbling did not occur at the time of filtration. Further, as compared with a process of using staple, equipments such as crimper, cutter, etc. were unnecessary. Still further, since the spinning and shaping can be carried out according to a continuous process, the filter could be produced with a good productivity.

Example 2

Spinning was carried out at a speed of 1,500 m/min. by means of air sucker and other spinning conditions, shaping conditions, etc. were the same as those in Example 1. A cylindrical filter having an inner diameter of 30 mm, an outer diameter of 60 mm and a length of 250 mm was obtained. The fineness of the resulting web was 3 d/f.

This filter had fibers hot-melt-adhered and was a hard product.

The test results of the filtrability, etc. of the cylindrical filter are shown in Table 1.

This filter exhibited superior properties of filtration accuracy, dispersion index of filtration accuracy, filtration life, etc. and no bubbling occurred at the time of filtration. Further, as compared with the process using staple, equipments such as crimper, cutter, etc. were unnecessary. Still further, since the spinning and shaping can be carried out according to a continuous process, the productivity was good.

Comparative Example 1 and Comparative Example 2

Using a staple consisting of a high density polyethylene as a sheath component and polypropylene as a core component, and having a conjugate ratio of 50/50 (% by weight), a fineness of 1.4 d/f, a fiber length of 51 mm and 12 crimps/25 mm (Comparative example 1), and another staple consisting of the above components and having a fineness of 3.0 d/f, a fiber length of 51 mm and 12 crimps/25 mm (Comparative example 2), webs according to carding process, having a basis weight of 20 g/m² were prepared. These webs were transferred to a cylindrically shaping machine described in Example 1, followed by heating them at 145° C., winding them around a metal core, cooling, cutting, etc., to obtain two kinds of cylindrical filters each having the same size as in Example 1.

The test results of the filtrability, etc. of the cylindrical filters are shown in Table 1. These filters were both superior in the properties of the filtration accuracy, dispersion index of filtration accuracy, filtration life, etc. However, both of the products caused bubbling at the time of filtration; thus it was judged that it was impossible to use them for the liquid filtration in food field.

Comparative Example 3 and Comparative Example 4

The two kinds of the conjugate fibers of HDPE/PP used in the above Comparative examples 1 and 2, were washed with hot water at 60° C. for one hour, followed by washing them with water to wash off attached oiling agent, subjecting the resulting fibers to centrifugal dehydration, drying them at 105° C., and preparing webs having a basis weight of 20 g/m², in the same manner as in the above Comparative examples 1 and 2.

The uniformity of the webs at the time of carding were far inferior; the opening properties of the fibers were inferior; and a number of webs in a bulky form, having a diameter of 3 to 8 cm, were mixed in the above webs. Further, notable static electricity occurred at the time of carding; thus, cylindrically shaped products were obtained by shaping while often stopping the carding.

The webs were transferred to the cylindrically shaping machine described in Example 1, followed by heating them at 145° C., winding them around a metal core, cooling, cutting, etc., to obtain two kinds of cylindrical filters having the same size in Example 1.

The test results of filtration properties, etc. of the cylindrical filters are shown in Table 1. As to the filters, bubbling was improved in either of Comparative example 3 (fineness: 1.4 d/f) and Comparative example 4 (fineness: 3.0 d/f), but the properties of filtration accuracy, filtration life, etc. were inferior to those in Examples 1 and 2. And yet, the filters had a large dispersion index of filtration and an inferior uniformity.

The properties, etc. of the filters are shown in Table 1.

Example 3

Using the spinning device according to conjugate spunbonding process and the production device for cylindrically shaped product, both used in Example 1, filters having different finenesses in the thickness direction of the filters were shaped. However, the spinning nozzles of Example 1 were replaced by side-by-side type conjugate spinning nozzle having a hole diameter of 0.4 mm.

As the first component, propylene.ethylene.butene-1 random copolymer (MFR: 65 (g/10 min, 230° C.); melting point: 138° C.; ethylene: 4.0% by weight; and butene-1: 4.5% by weight), and as the second component, polypropylene (MFR: 75 (g/10 min., 230° C.) and melting point: 163° C.), were used. Spinning temperatures of the two components were both 290° C. The conjugate ratio was 50/50 (% by weight). The sucking speed of the air sucker was varied to 1125 m/min. at the initial time of filter winding, 2667 m/min. at the medium period thereof and 750 m/min. at the end thereof, to obtain a cylindrical filter of a density gradient type, whose fineness was varied to 4 d/f, 1.7 d/f and 6 d/f. In addition, the basis weight of the web was 20 g/m² and the heating temperature was 148° C. This filter had fibers hot-melt-adhered and was a hard product. The cylindrical filter had an inner diameter of 30 mm, an outer diameter of 60 mm and a length of 250 mm. The test results of the filtration properties of the cylindrical filter are shown in Table 1. This filter had a superior filtration accuracy and dispersion index of filtration accuracy. Further, it caused no bubbling at the time of filtration. Further, as compared with Comparative examples 1 and 2, devices of crimper, cutter, etc. were unnecessary, and since the spinning and shaping are carried out according to a continuous process, the filter could be produced with good productivity.

Example 4

A filter was shaped, using the spinning device for conjugate spun-bonding process and the production device of cylindrically shaped product, employed in Example 1. However, a device provided with stretching rolls at a position between the spinning nozzles and the air sucker was employed. Further, the device was provided with a quenching means of cold air feeding type at a position between the spinning nozzles and the stretching rolls. As the spinning nozzles, side-by-side type spinning nozzles having a hole diameter of 0.4 mm, same as that in Example 3, were used.

Using two kinds of resins same as in Example 3, spinning was carried out under conditions of conjugate ratio, spinning temperature, etc., same as those in Example 3. Fibers before suction by means of air-sucker were stretched to twice the original length at 80° C., by means of stretching rolls, followed by sucking the stretched yarns at a speed of 1500 m/min. by means of air sucker and blowing them onto a net conveyer. Further, at the time of spinning, the fibers were quenched by air at 24° C., at an air speed of 0.3 m/sec. from the lateral side of the fibers between the spinneret and the stretching rolls. The fineness of the fibers was 3.2 d/f somewhat larger than the theoretical value thereof, presumably due to slip caused by stretching. The basis weight of the web was 21 g/m². The collected web was heated up to 150° C., to obtain a cylindrical filter having an inner diameter of 30 mm, an outer diameter of 60 mm and a length of 250 mm. This filter was a product having fibers hot-melt-adhered and being hard. The test results of the filtration properties, etc. of this cylindrical filter are shown in Table 1. This filter exhibited superior filtration life, pressure resistance, etc. to those of the filter using the staple of Comparative example 2, whose fineness was almost the same as that of Example 4. Further, no bubbling occurred at the time of filtration. Still further, as compared with Comparative examples 1 and 2, devices such as crimper, cutter, etc. were unnecessary, and since spinning and shaping are continuously carried out, the filter could be produced with a good productivity.

Example 5

A filter was shaped using the spinning device according to conjugate, spun-bonding process and the production device for cylindrically shaped product in Example 1. However, a device provided with stretching rolls at a position between the spinneret and the air-sucker was used. Further, the spinning device was provided with a quenching means of cold air-sending type at a position between the spinneret and the stretching rolls.

A poly(ethylene terephthalate-co-ethylene isophthalate) having an intrinsic viscosity of 0.56 and a metling point of 190° C., and a polyethylene terephthalate having an intrinsic viscosity of 0.65 and a melting point of 254° C. were used. Conjugate spinning was carried out using the lower melting resin on the sheath side and the higher melting resin on the core side, in a conjugate ratio of 50/50 (% by weight) and at spinning temperatures of 280° C. in the case of the lower melting resin and 290° C. in the case of the higher melting resin. At the time of the spinning, the fibers were stretched to twice the original length at 90° C. by means of the above stretching rolls, followed by blowing the stretched fibers onto a net conveyer at a speed of 750 m/min. by means of the air sucker. Further, at the time of spinning, the fibers were quenched by air at 26° C., from the lateral side of the fibers at a position between the spinneret and the stretching rolls, at an air speed of 0.4 m/sec. The resulting long fibers had a fineness of 6.2 g/f somewhat larger than the theoretical value, presumably due to slip by stretching. Further, the basis weight of the web was 21 g/m². The web was then shaped into a cylindrical form at 195° C. in the same manner as in Example 1, to obtain a cylindrical filter having an inner diameter of 30 mm, an outer diameter of 60 mm and a length of 250 mm. This filter had fibers hot-melt-adhered and was a hard product. The filtration properties, etc. of the cylindrical filter are shown in Table 1. This filter exhibited superior dispersion index of filtration accuracy, pressure resistance, etc. Further, no bubbling occurred at the time of filtration.

Example 6

A cylindrical, draining material was shaped, using the spinning device according to conjugate, spun-bonding process and the production device for cylindrically shaped product in Example 1. However, a spinneret of sheath-and-core type having a hole diameter of 0.6 mm was used, and a metal core having an outer diameter of 100 mm was used as the core of the cylindrically shaping device.

Spinning was carried out by using a high density polyethylene of an MFR 22 (190° C., g/10 min.) and a melting point of 132° C., on the sheath side and a polypropylene of an MFR 18 (230° C., g/10 min.) and a melting point of 164° C., on the core side, in a composite ratio of 40/60 (% by weight), at spinning temperatures of 285° C. on the sheath side and 300° C. on the core side and at a spinning speed of 300 m/min., so as to nip the fibers between a pair of pinch rolls, followed by sucking the resulting fibers by means of an air sucker provided below the pinch rolls and blowing the fibers onto a net conveyer at a speed of 338 m/min. The fibers had a fineness of 32 d/f. Thereafter, the resulting web of long fibers was heated up to 147° C. in the same manner as in Example 1 and wound on the metal core of an outer diameter of 100 mm so as to afford a definite outer diameter. The web was then cooled down to 28° C., followed by drawing out the core and cutting the resulting material by a cutter, to obtain a draining material having an inner diameter of 100 mm, an outer diameter of 150 mm and a length of 1,000 mm. Five units of this draining material were connected by pipes of polyvinyl chloride having a length of 12 cm, to obtain a draining material having a length of 5 m, followed by hot-melt-adhering only one end of the material onto a polypropylene resin sheet of 1.2 mm thick to seal the end. Using 30 units of the connected draining material, and making the end surface-sealed side upstream side and opening the non-sealed side part to a waste water-discharging groove of concrete, they are laid on a slant ground of a golf course at an interval of 2 m and used as a draining material. As a result, it was confirmed that the field on which the draining material was used, was superior in the draining property to the field on which no draining material was used.

Example 7

A cylindrical, draining material was shaped using the spinning device according to conjugate, spun-bonding process and the device for producing a cylindrically shaped product of Example 1. However, a spinneret of sheath-and-core type having a hole diameter of 1.0 mm was used.

Spinning was carried out using a propylene.ethylene.butene-1 random copolymer and a polypropylene same as those in Example 3, and using the random copolymer on the sheath side and the polypropylene on the core side, each at a spinning temperature 280° C. The spinning was carried out by stopping the suction by means of an air suction and by the self-weight of the spun fibers, followed by collecting the resulting web on a net-conveyer. The resulting fibers had 480 d/f. The long fiber web was then wound around a metal core having an outer diameter of 80 mm while heating at 150° C., till the outer diameter reached a definite one, in the same manner as in Example 1, followed by cooling the wound material down to 28° C., drawing out it from the core, and cutting it by means of a cutter, to obtain a draining material having an inner diameter of 80 mm, an outer diameter of 180 mm and a length of 1,000 mm. This draining material had fibers hot-melt-adhered and was a hard product. Two units of this draining material were connected, followed by winding a water-permeable non-woven fabric of 150 mm wide around the connected part and binding the part by a wire, to obtain a draining material having a length of 2 m. Thereafter, only one end thereof was sealed by a polypropylene resin sheet of 1.2 mm thick, hot-melt-adhered to the end. Using forty units of the thus connected draining materials, and making the end surface-sealed side, upstream side, and opening the non-sealed side to a water-discharging groove of concrete, the materials were laid to the nominal of a reclaimed weak ground at a distance of 1.5 m and were used as a draining material. The ground having used the material was confirmed to have a good draining property.

Example 8

A filter after filtration life test was washed with water according to counter-washing process to carry out a refiltration test. As the test device, the above-mentioned test device for filtration accuracy was used. As the cylindrical filter, those of Example 1 and Comparative example 1 were used. The cylindrical filters were subjected to filtration life test under the same conditions as those of the above filtration life test, and when the pressure difference reached 3 Kg/cm², the test was once stopped, followed by sending water alone from the inner side to the outer side of the filter, at a rate of 6 l/min. for 20 minutes, to counter-wash the resulting caught cake, and then again adding a cake into the water tank and carrying out a filtration life test same as the above.

As to the filter of Example 1, the total of the filtration time before the counter-washing and the filtration time after the counter-washing was 62 minutes (34 minutes up to a pressure difference of 3 Kg/cm², and 28 minutes in terms of the filtration life after the counter-washing). Further, the pressure resistance after the counter-washing was 6.7 Kg/cm².

As to the filter of Comparative example 1, the total of the filtration time before the counter-washing and the filtration life after the counter-filtration was 46 minutes (25 minutes up to a pressure difference of 3 Kg/cm², and 21 minutes in terms of the filtration life after the counter-washing). Further, the pressure resistance after the counter-washing was 5.9 Kg/cm².

In the case of the filter of the present invention, it was possible to extend the filtration life by the counter washing, and its reuse was possible. Whereas, in the case of the filter of Comparative example 1, the extention time of the filtration life by way of the counter washing was very short.

Effectiveness of the Invention

The cylindrically shaped product of the present invention exhibits characteristics such as superior filtrability, superior pressure-resistance, no bubbling at the time of water passage, high hardness, superior water-permeability, capability of carrying out counter-washing, etc. Thus, the cylindrically shaped product can be suitably used as filter or draining material.

Further, as to the process for producing a cylindrically shaped product of the present invention, it is possible to efficiently and easily produce a cylindrically shaped product over small fineness to large fineness by means of a simple device. As to the resulting fibers, since any oiling agent for spinning is not used, adhesion of such agent to the fibers does not occur.

TABLE 1

| No | Kind of fiber | Used cake Accuracy | Used cake Life | Filtration accuracy Accuracy | Filtration accuracy Index | Filtration life | Pressure-resistance | Bubbling |
|---|---|---|---|---|---|---|---|---|
| Example 1 | Conjugate SB | #600 | Volcanic ash | 18.5 | 0.40 | 48 | 6.8 | No |
| Example 2 | Conjugate SB | #600 | Volcanic ash | 26.1 | 0.46 | 58 | 8.2 | " |
| Compar. ex. 1 | Staple | #600 | Volcanic ash | 17.5 | 0.51 | 41 | 6.0 | Yes |
| Compar. ex. 2 | " | #600 | Volcanic ash | 26.0 | 0.56 | 49 | 7.1 | Yes |
| Compar. ex. 3 | " | #600 | Volcanic ash | 21.6 | 1.63 | 34 | 5.3 | No |
| Compar. ex. 4 | " | #600 | Volcanic ash | 29.2 | 1.29 | 38 | 5.9 | " |
| Example 3 | Conjugate SB | #600 | Volcanic ash | 12.5 | 0.37 | 45 | 8.7 | " |
| Example 4 | Conjugate SB | #600 | Volcanic ash | 26.2 | 0.35 | 65 | 8.9 | " |
| Example 5 | Conjugate SB | #600 | Volcanic ash | 37.0 | 0.65 | 68 | 9.6 | " |

Conjugate SB: conjugate spun-bonding
600: carborundum #600 (its 80% by weight or more has a particle diameter of 10 to 33 microns)
Volcanic ash: volcanic ash soil (average particle diameter: 12.9 microns; its 99% by weight or more has a particle diameter of 1.0–30 microns)

What is claimed is:

1. A cylindrically shaped product obtained by binding around a core, multi-component, conjugate spun-bonded long fibers consisting at least of two components of a low melting resin component and a high melting resin component, the temperature difference between said at least two components being 10° C. or higher, and said at least two components being hot-melt-adhered by said low melting resin component.

2. A cylindrically shaped product according to claim 1, wherein said multi-component, conjugate spun-bonded long fibers consist of 10 to 90% by weight of said low melting resin component and 90 to 10% by weight of said high melting resin component, and said low melting resin component forms at least a part of the surface of the fibers.

3. A cylindrically shaped product according to claim 1, wherein said multi-component, conjugate, spun-bonded long fibers have a ratio of the largest fineness to the smallest fineness of 1.5 or more and these long fibers are arranged along the thickness direction of said cylindrically shaped product.

4. A cylindrically shaped product according to claim 1, wherein the dispersion index of the filtration accuracy of said body is 0.7 or less.

5. A cylindrically shaped product according to claim 1, wherein other fibers are laminated to said conjugated, spun-bonded long fibers or mixed therein.

6. A cylindrically shaped product according to claim 1, wherein said multi-component, conjugate, spun-bonded long fibers have a fineness of 0.2 to 70,000 d/f.

7. A cylindrically shaped product according to claim 1, wherein said low melting resin component is a resin selected from the group consisting of polyethylene, a crystalline copolymer of propylene with another α-olefin and a low melting polyester, and said high melting component is polypropylene.

8. A cylindrically shaped product according to claim 1, wherein the resin of said low melting resin component is a resin selected from the group consisting of polyethylene, a crystalline copolymer of propylene with another α-olefin and a low melting polyester and said high melting resin component is polyethylene terephthalate.

9. A cylindrically shaped product according to claim 1, wherein either one of the surface or the inside part of said cylindrically shaped product is embossed so as to form projections or depressions.

10. A filter using the cylindrically shaped product according to claim 1.

11. A draining material using the cylindrically shaped product according to claim 1.

12. The cylindrical shaped product of claim 1 wherein said conjugate spun-bonded long fibers are oiling agent-free.

* * * * *

UNITED STATES PATENT AND TRADEMARK OFFICE
CERTIFICATE OF CORRECTION

PATENT NO. : 5,753,330
DATED : May 19, 1998
INVENTOR(S) : Taiju TERAKAWA et al.

It is certified that error appears in the above-identified patent and that said Letters Patent is hereby corrected as shown below:

At column 2, line 25, "HEI 2-14582 should be "HEI 2-145842".

Signed and Sealed this

Third Day of November, 1998

*Attest:*

BRUCE LEHMAN

*Attesting Officer*  *Commissioner of Patents and Trademarks*